May 14, 1940.  A. G. HEGGEM  2,200,474
VALVE ACTUATING MECHANISM
Filed July 13, 1938  4 Sheets-Sheet 1
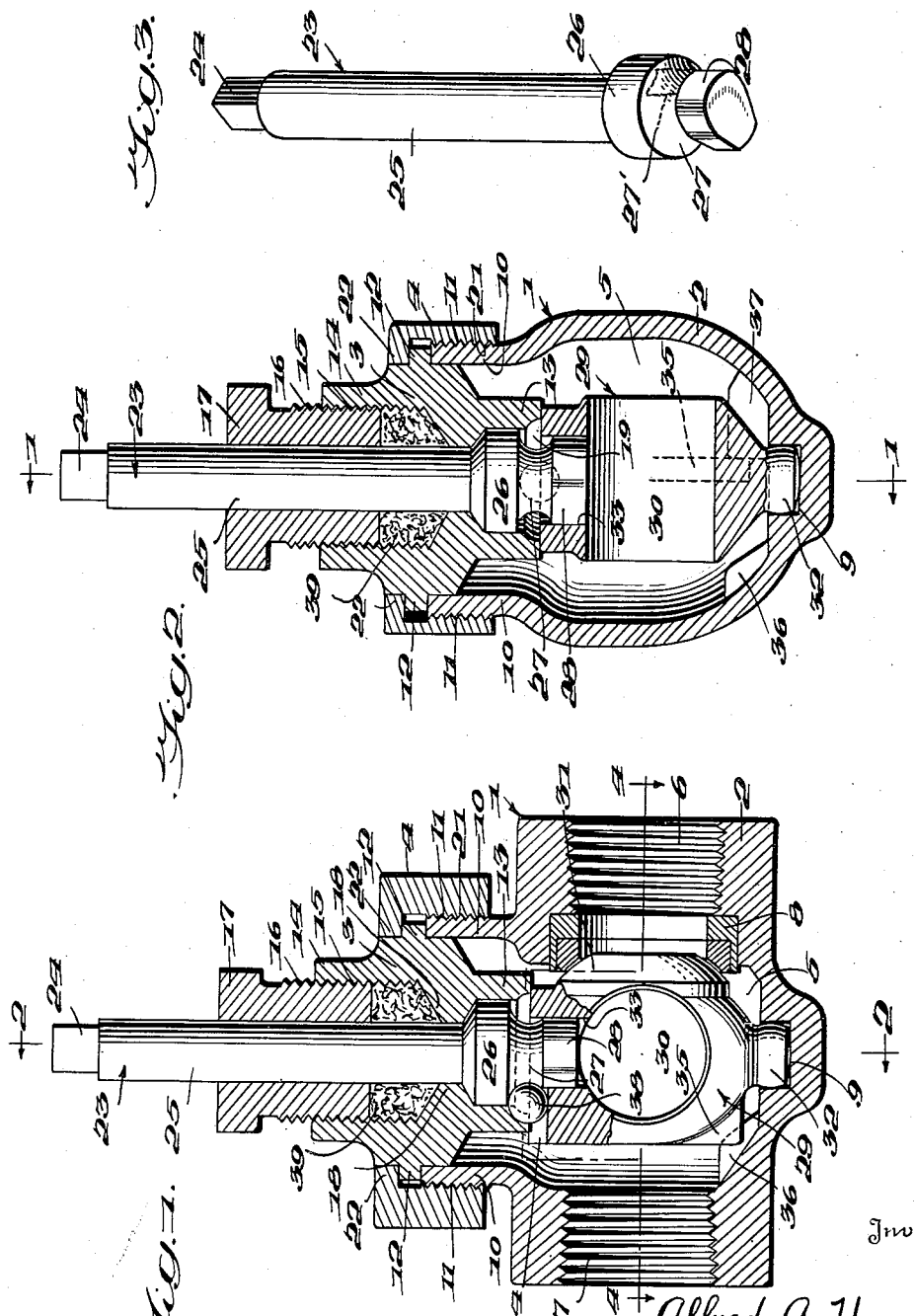
Inventor:-
Alfred G. Heggem,
By Smith, Michael & Gardiner
Attorneys.

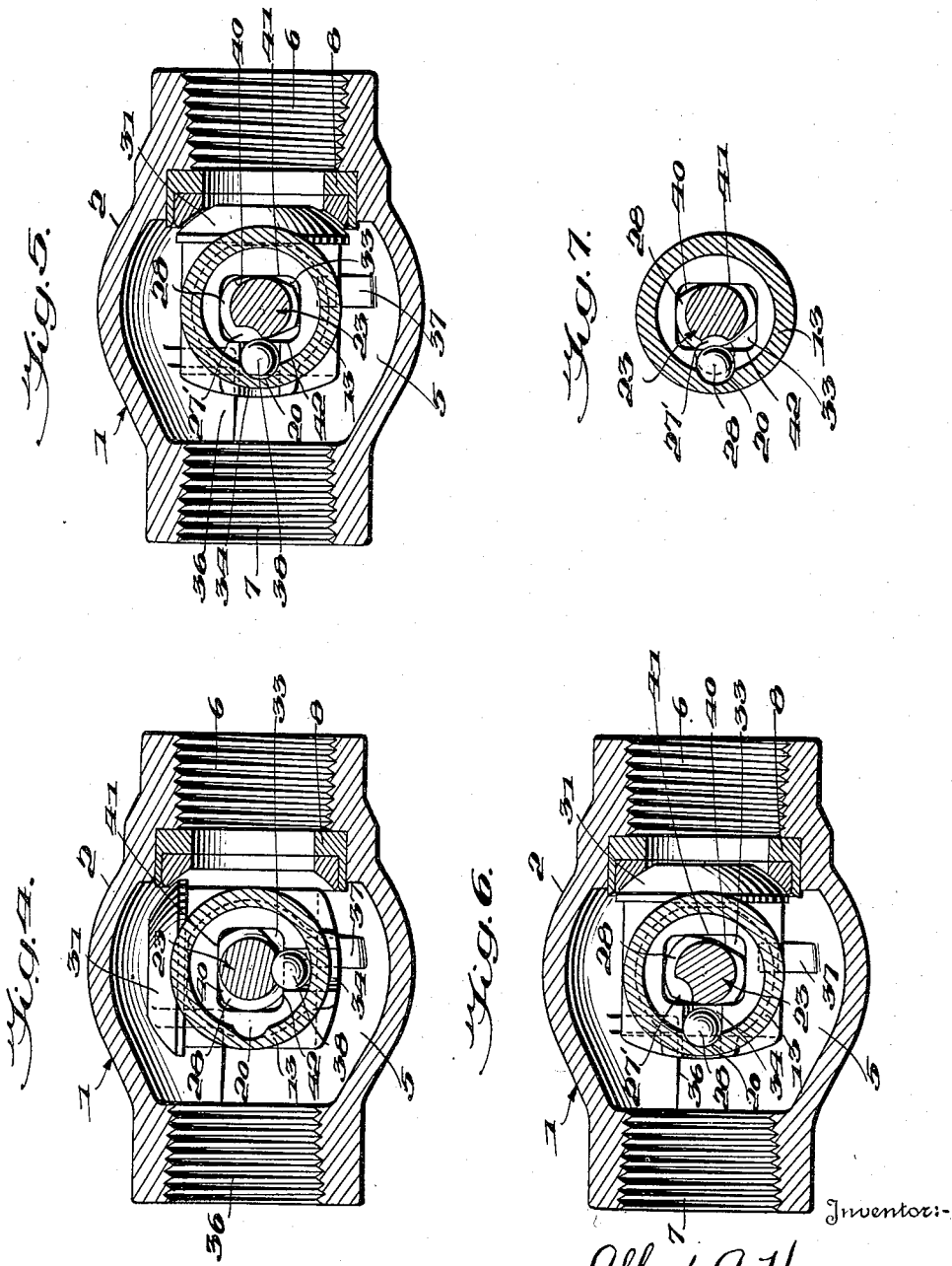

May 14, 1940.   A. G. HEGGEM   2,200,474
VALVE ACTUATING MECHANISM
Filed July 13, 1938   4 Sheets-Sheet 3
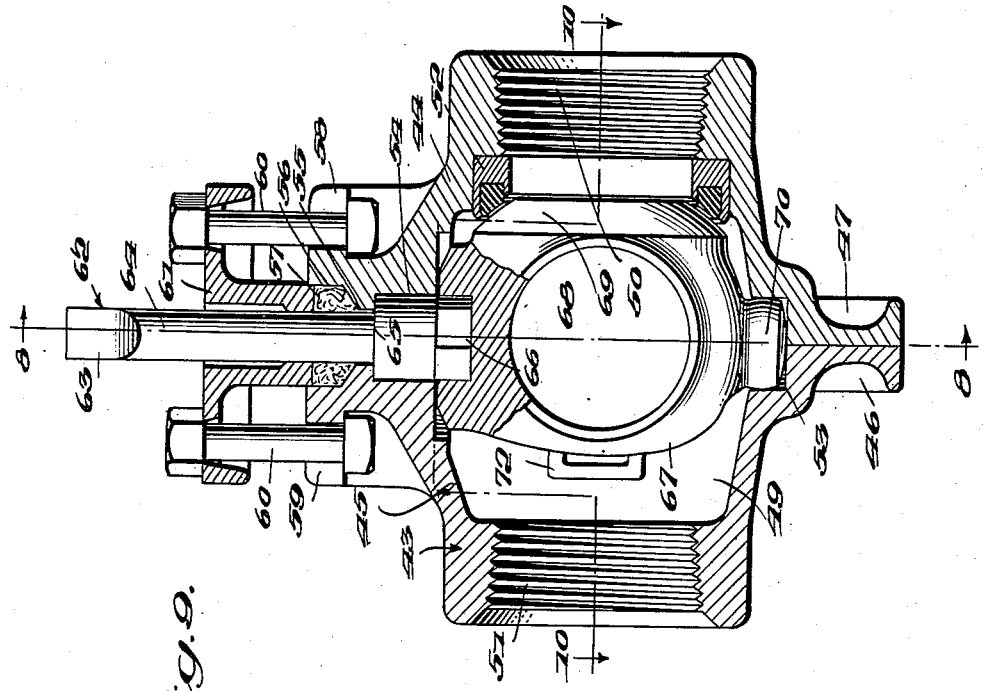

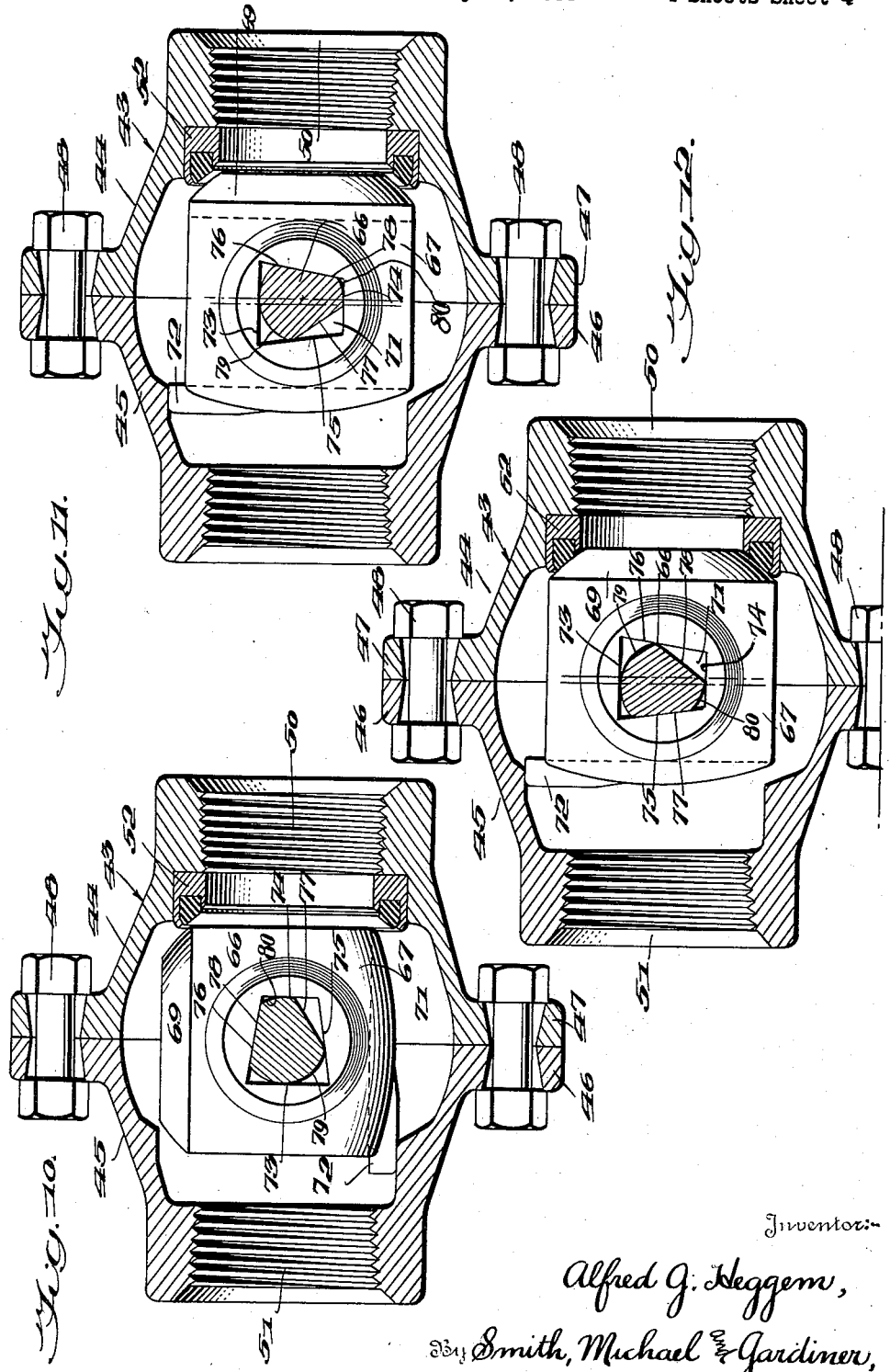

Patented May 14, 1940

2,200,474

UNITED STATES PATENT OFFICE 2,200,474

VALVE ACTUATING MECHANISM

Alfred G. Heggem, Tulsa, Okla.

Application July 13, 1938, Serial No. 219,053

14 Claims. (Cl. 251—91)

My invention relates to valves of the type in which a valve core or fluid controlling member is rotated and also rocked or tilted within a valve body during movements of the valve core or member to open and/or closed position, and has particular reference to an improved actuating mechanism for effecting such movements of the valve core or member.

In numerous United States Letters Patents previously granted to me, such as Letters Patent 1,989,009 dated January 22, 1935 and 2,076,838—2,076,839—2,076,840 and 2,076,841, all dated April 13, 1937, I have disclosed and claimed novel valve constructions including a valve body having inlet and outlet openings and a valve chamber communicating with said openings; a valve core disposed within the chamber and rotatable therein; a valve stem rotatable with respect to the valve body; and means controlled by the rotation of the valve stem for alternately rotating and tilting the valve core. The combined rotating and tilting action of the valve core as presented in my aforesaid patents and in this application, constitutes an important development in the art of valve constructions, and affords a highly efficient and reliable means for controlling the flow of fluids, due to the ease of rotation of the valve core and the positive sealing and seating action effected by the tilting movement of the valve core into contact with its cooperating valve seat. Valves of the general type disclosed and claimed in my aforesaid patents and in this application, i. e., valves in which the valve core or fluid-controlling member partakes of a compound motion of rotative and non-rotative movements sequentially and alternately, provide a highly satisfactory and efficient means for controlling fluid flow, and while such valves are adapted for use in numerous installations, arts and industries, such valves are especially suitable for use in the control of fluids operating under relatively high pressures, such as the pressures frequently encountered in oil and gas wells, pipe lines and other high pressure installations.

The principal object of my present invention is to provide a novel and simple valve actuating mechanism for valves of the above mentioned character by means of which the sequential and alternate rotative and non-rotative movements of the valve core are effected, which valve actuating mechanism is materially simplified in construction and operation as compared with the mechanisms shown in my aforesaid patents, which simplicity and reduction in the number of parts in no way detracts from the effectiveness or efficiency of the valve.

It is an object of my present invention to provide a novel and simple actuating or coupling means between the valve stem and the valve core to effectively transmit the motion of the valve stem to the valve core to cause an initial tilting of the valve core away from its cooperating valve seat and a subsequent rotation of the valve core to aline the passage therethrough with the inlet and outlet openings in the valve body as the said valve core is moved toward open position, and, when the valve stem is moved to close the valve, to cause an initial rotation of the valve core to move the passage therethrough out of alinement with the inlet and outlet openings in the valve body and a subsequent tilting of the valve core to move the flow-restricting portion thereof into firm and positive engagement with the cooperating valve seat.

It is a further object of my present invention to provide a novel actuating mechanism of the type above referred to and including a valve stem of simple form having a projecting cam portion at its lower or inner end adapted to enter a recess or socket in the upper end of the valve core, this cam-and-socket connection being so shaped and proportioned that during a portion of the rotation of the valve stem, the valve core will rotate with the valve stem and that during other portions of the rotation of the valve stem said stem will rotate relative to the valve core to tilt said valve core about its mounting in the valve chamber to move the said core into or out of engagement with the cooperating valve seat.

It is a further object of my present invention to provide a cam-and-socket connection between the valve stem and the valve core by means of which rotative movement of the valve stem results in sequential and alternate rotating and tilting movements of the valve core, and to provide means for coupling the valve stem to the valve core so that when the valve core is moved toward closed position the valve stem and valve core will be initially constrained to move together or in unison through approximately ninety degrees, whereupon continued rotation of the valve stem will permit the said stem to rotate independently of the rotation of the valve core to effect the tilting of the said valve core about its mounting in the valve chamber, the arrangement being such that the cam-and-socket connection between the valve stem and valve core inhibits tilting movement of the valve core in a direction normal to the axis of the stem in one plane passing through the axis of the stem, but permits such movement of the valve core in a plane at right angles to the first mentioned plane and passing through the axis of said stem.

It is a still further object of my present invention to provide a valve of the above mentioned character which is simple in construction and operation, easy to assemble and disassemble, strong and durable, highly efficient in the purposes for which designed, and the actuating mechanism of which has been reduced to a minimum of parts.

In the accompanying drawings forming a part of this specification and wherein, for the purpose of illustration, I have shown several preferred embodiments of my invention:

Figure 1 is a central, vertical sectional view of a valve embodying the features of my present invention, this view being taken on the line 1—1 of Figure 2, and showing the arrangement of parts after the core has been rotated toward closed position but before the core has been tilted to force the said core into firm and positive contact with the cooperating valve seat, Figure 2 is a central vertical sectional view on the line 2—2 of Figure 1, Figure 3 is a perspective view of the valve stem employed in that form of my present invention shown in Figures 1 to 7 inclusive, Figure 4 is a transverse sectional view along the line 4—4 of Figure 1 and showing the arrangement of parts when the valve core is in open position, Figure 5 is a transverse sectional view along the line 4—4 of Figure 1 and showing the arrangement of parts after the valve core has been rotated toward closed position but before the core has been tilted to force the said core into firm and positive contact with the cooperating valve seat, Figure 6 is a transverse sectional view along the line 4—4 of Figure 1 and showing the arrangement of parts after the valve core has been tilted into firm and positive contact with the cooperating valve seat, Figure 7 is a transverse sectional view along the central portion of the line 4—4 of Figure 1 showing the position of the cam-and-socket connection between the valve stem and the valve core at a point in the cycle of operations where the valve core has been tilted away from the valve seat during the initial movement of the valve stem to move the valve core to open position, Figure 8 is a central, vertical, sectional view of a modified form of valve casing and a modified form of valve actuating mechanism embodying features of my present invention and showing the valve core in closed position, this view being taken along the line 8—8 of Figure 9, Figure 9 is a central, vertical, sectional view of the modified form of my invention shown in Figure 8, this view being taken along the line 9—9 of Figure 8, Figure 10 is a transverse sectional view of the modified form of my invention shown in Figures 8 and 9 and showing the valve core in open position, this view being taken along the line 10—10 of Figure 9, and, Figures 11 and 12 are views similar to Figure 10 and showing, respectively, the valve core in partially closed and in completely closed positions.

Referring more particularly to the accompanying drawings wherein like reference numerals have been employed to designate like parts throughout the several views, Figs. 1 to 7 inclusive disclose a preferred embodiment of my present invention as applied to a valve, the valve core of which partakes of combined rotating and tilting movements when being moved from open to closed position and vice versa. In the modification here referred to, the valve body or casing, indicated generally by the reference numeral 1, is shown as comprising three main sections numbered 2, 3 and 4, which sections are detachably secured together in superposed relation.

The lower section 2 of the valve body includes a closed bottomed, open topped valve chamber 5 communicating with laterally-extending passages 6 and 7 for the outflow and inflow, respectively, of the fluid or fluids to be controlled by the valve. These passages 6 and 7 are disposed in axial alinement and are preferably threaded to permit the valve to be screwed on to a well casing, pipe or the like, this construction, because of the axial alinement of the inlet and outlet passages and the construction of the preferred form of valve core to be hereinafter described, being admirably suited for use as a well casing valve, where it is frequently desired to operate the bits or other drilling or pumping tools directly through the valve and without the necessity of removing the valve from the casing. The outlet passage 6 is preferably provided with a machined valve seat insert 8 positioned at the inner end of said passage. The wall defining the bottom of the valve chamber 5 is provided with a centrally-located, circular recess 9 for a purpose to be hereinafter described, and the upper portion of the casing or body section 2 includes an upstanding annular flange 10 provided on its outer surface with threads 11.

The intermediate section 3 of the valve body includes a peripheral flange 12 adapted to rest upon the upper end of the annular flange 10 of the lower section 2; a lower depending annular flange 13 which extends downwardly into the upper portion of the valve chamber 5; and an upwardly extending annular flange 14 provided on its inner surface with threads 15 adapted to cooperate with threads 16 on a threaded plug or "follower" 17. It is to be noted that the intermediate section 3 is provided with an axial bore through a partition 18 which separates the annular chambers formed by the upwardly extending annular flange 14 and by the depending annular flange 13, the upper and lower surfaces of said partition 18 preferably being sloped or inclined downwardly and upwardly, respectively, toward the central bore extending through said partition, as clearly indicated in Figs. 1 and 2 of the accompanying drawings. The inner surface of the lower end of the annular flange 13 is provided with an enlarged countersunk portion 19, the wall of which is curved on an arc of approximately ninety degrees, and said countersunk portion 19 is provided with a vertically extending notch or recess 20, of substantially semi-circular transverse cross section, as best shown in Figs. 4, 5 and 6 of the accompanying drawings.

The section 4 of the valve body is provided with internal threads 21 adapted to cooperate with the external threads 11 on the outer surface of the upstanding annular flange 10, and is further provided with an inwardly-extending flange 22 adapted to overlie the peripheral flange 12 of the intermediate section 3 of the valve body 1, the external surface of the section 4 having flattened portions, i. e., being of square, hexagonal, octagonal or of other non-circular cross-section, whereby a wrench or other suitable tool may be employed to screw the section 4 onto the section 2 to rigidly clamp the peripheral flange 12 between the top of the upstanding flange 10 and the bottom or inner surface of the inwardly-extending flange 22.

The valve stem employed in this form of my invention is designated broadly by the reference numeral 23, and includes a reduced, non-circular, end portion 24 adapted to be engaged by a suitable handle (not shown) by means of which rotation is imparted to the valve stem; a relatively long, intermediate portion 25 of circular cross-section and of a diameter corresponding substantially to the diameter of the bore through the partition 18; an enlarged portion 26 of circular cross-section and of a diameter corresponding substantially to the diameter of the inner surface of the depending flange 13; an annular groove or channel 27 having a curved wall of substantially semi-circular shape or configuration, said groove having in the wall thereof a vertically-extending notch or recess 27' of substantially semi-circular transverse cross-section as best shown in Figs. 4, 5 and 6 of the accompanying drawings; and a lower end portion 28 of substantially "keystone" or substantially trapezoidal shape or configuration, i. e., having two slightly arcuate bases, one of which is longer than the other and which bases are connected by side surfaces which converge from the ends of the longer base to the ends of the shorter base, as is common in all geometrical figures of substantially "keystone" or substantially trapezoidal shape or configuration. This end portion constitutes the cam of a cam-and-socket coupling to be hereinafter described, it being noted that the lower end portion 28 of the stem constitutes a non-circular cam including lobes at least two of which are disposed on opposite sides of the axis of the valve stem.

Adapted for positioning within the valve chamber 5 is a valve core 29 formed with a passage 30 cylindrical throughout its length and of a diameter corresponding substantially to that of the passages 6 and 7 of the valve body so as to afford a straight, uninterrupted passage for the flow of fluid through the valve when the valve core is moved to open position. One of the flat, imperforate side portions of the valve core 29 is machined to form a tapered valve face 31, which valve face is of sufficient extent to border the inner margin of the passage 6 and is so machined as to cooperate with the valve seat insert 8 to effect a fluid-tight seal or closure when said face is moved into firm and positive contact with said seat insert. The lower surface of the valve core 29 is provided with a centrally-located trunnion 32, the outer face of which is slightly curved, this trunnion fitting into the recess 9 formed in the bottom wall of the valve chamber 5. The upper surface of the valve core 29 is substantially flat and is provided with a centrally-located, non-circular, preferably rectangular, recess or socket 33 which constitutes the socket of a cam-and-socket coupling to be hereinafter described, this socket or recess being preferably disposed in axial alinement with the trunnion 32. This socket includes a pair of opposed, parallel walls 41 and 42 which are disposed in planes substantially parallel to the plane of the valve face 31 and which are spaced apart a distance only slightly exceeding the length of the cord of the longer base of the substantially "keystone" or substantially trapezoidal cam portion 28, so that when the said cam is inserted within the socket, the opposite ends of the longer base of the cam will engage the opposed parallel walls of the socket. It will be particularly noted that each of the side walls 41 and 42 of the socket, which walls are disposed in planes substantially parallel to the plane of the valve face 31, are disposed on opposite sides of the axis of the valve stem and extend transversely to the line of movement of the valve core. Extending along the upper surface of the valve core 29 is a horizontal groove 34 which is substantially semi-circular in transverse cross-section, this groove extending from the recess or socket 33 outwardly toward the periphery of the valve core 29 and in a direction normal to the plane of the valve face 31. The valve core 29 is provided with a lug 35 projecting radially from the lower portion of the said core and adapted to engage fixed stop lugs 36 and 37 projecting inwardly from the inner surface of the walls defining the valve chamber 5. A ball 38 is positioned within the groove 34 in the upper surface of the valve core 29 and serves as a means for locking the valve stem and valve core together so that they will rotate in unison during a portion of the cycle of operation, and which will permit the valve stem to partake of independent rotation with respect to the valve core to effect the tilting or rocking movement of the said valve core. It is to be noted that the maximum overall length of the valve core 29 is in a direction parallel to the axis of the passage 30, and, as viewed in Fig. 1 of the accompanying drawings, this maximum overall length is less than the internal diameter of the upstanding flange 10. Hence, the valve core 29 may be readily inserted within, and removed from, the chamber 5 through the upper end of the section 2 of the valve casing.

Referring now to the manner of assembling the various component parts above described in connection with that form of my present invention illustrated in Figs. 1 to 7 inclusive, the first step of such assembly consists in inserting the valve core 29 within the valve chamber 5 with the trunnion 32 disposed in the recess 9 and with the flow passage 30 through the valve core 29 alined with the passages 6 and 7. The valve stem 23 is then inserted through the lower end of the flange 13 and through the bore through the partition 18 so that the cylindrical portion 26 of the stem is disposed within the chamber provided by the flange 13, with the upwardly sloping or inclined surface of the cylindrical portion 26 in engagement with the upwardly sloping or inclined bottom wall of the partition 18. Packing material 39 is then inserted within the chamber above the partition 18 and the threaded plug or "follower" 17 is screwed down to compress said packing into fluid-tight contact with the cylindrical portion 25 of the valve stem. A valve wheel or handle (not shown) is then secured to the non-circular portion 24 of the valve stem. The intermediate section 3 through which the valve stem 23 has been inserted, is then superimposed upon the body section 2 with the ball 38 positioned within the grooves 27 and 34 and the peripheral flange 12 resting upon the upper end of the flange 10, and with the cam 28 disposed within the recess or socket 33 with the ends of the longer base of the said cam 28 contacting the opposed parallel walls of the recess or socket 33 on opposite sides of the axis of the valve stem. The section 4 is then screwed onto the upstanding threaded flange 10, the engagement between the flange 12 and the inturned flange 22, rigidly securing the parts in assembled relation.

Referring now to the operation of the valve and valve actuating mechanism described in detail above, and assuming that when assembled, the valve is in open position as illustrated in Fig. 4 of the accompanying drawings, rotation of the valve stem in a clockwise direction will cause the valve stem 23 and the valve core 29 to rotate together, due to the fact that the flat side face 40 of the cam 28 is in contact with the flat side wall 41 of the recess 33 and the further fact that the ball 38 is engaged within the recess 27' and is retained in said recess by the contact of the ball with the inner surface of the depending flange 13. When the valve stem has been rotated through a quarter of a revolution, the lug 35 strikes the stop lug 36 which arrests further rotation of the core, and when this occurs, the valve face 31 is disposed opposite the valve seat insert 8 and the ball 38 is disposed opposite the notch or recess 30. Continued rotation of the valve stem in a clockwise direction can no longer effect clockwise rotation of the valve core because of the engagement between the lug 35 and the stop 36, but such further rotation of the said stem results in the ball 38 being forced into the recess 20 and out of engagement with the recess 27', whereupon the parts assume positions shown in Fig. 5. Continued rotation of the valve stem in a clockwise direction causes the cam 28 to rotate within the socket 33 and, due to the trapezoidal or "keystone" shape of the cam 28, this rotation of the cam within the socket causes the flat side face 40 of the cam to move out of surface contact with the flat side wall 41 of the socket 33 and forces the upper, right-hand corner or lobe of the cam 28, as viewed in Figs. 5, 6 and 7, into sliding contact with the flat side wall 41 of the recess 33. As the upper right-hand corner or lobe of the cam 28, as viewed in Figs. 5, 6 and 7, slides downwardly along the flat side wall 41 of the recess 33, said corner or lobe moves in an arc about the vertical axis of the valve stem 23 and hence the said corner or lobe serves to tilt the valve core about the trunnion 32 and into firm and positive engagement with the valve seat insert 8, whereupon the valve is fully closed and the component parts thereof assume the positions shown in Fig. 6, it being noted that the slightly arcuate bases of the cam 28 permit the above described relative rotation between the cam 28 and the recess 33, and that the said relative rotation continues until the valve is fully closed and the flat side wall at the left of the cam 28 as viewed in Figs. 5, 6 and 7, moves into flat surface contact with the flat side wall 42 of the recess 33.

When it is desired to open the valve to permit the flow of fluid therethrough, i. e., when it is desired to move the valve from the closed position shown in Fig. 6 to the open position shown in Fig. 4, a counterclockwise rotation is imparted to the valve stem, and since the ball 38 is disposed in the notch or recess 20 and is retained therein by contact with the smooth surface of the groove 27, the valve core is positively locked against rotation with respect to the valve body. During the initial rotation of the valve stem in a counterclockwise direction the cam 28 rotates within the socket 33 and, due to the trapezoidal or "keystone" shape of the cam 28, this rotation of the cam within the socket forces the upper left hand corner or lobe of the cam 28, as viewed in Figs. 5, 6 and 7, into sliding contact with the flat side wall 42 of the recess 33. As the upper left-hand corner or lobe of the cam 28, as viewed in Figs. 5, 6 and 7, slides downwardly along the flat side wall 42 of the recess 33, said corner or lobe moves in an arc about the vertical axis of the valve stem 23 and hence said corner or lobe serves to tilt the valve core about its trunnion 32 and out of contact with the valve seat insert 8. The valve core then occupies the position shown in Fig. 5, it being noted that the tilting of the valve core away from its cooperating seat continues until the flat side face 40 of the cam 28 moves into flat surface contact with the flat side wall 41 of the recess 33. Continued rotation of the valve stem in a counterclockwise direction brings the notch or recess 27' into a position opposite the ball 38. Continued rotation of the valve stem in a counterclockwise direction causes the ball 38 to enter the recess 27' and to be retained therein by contact of the ball with the inner surface of the depending flange 13 and hence the valve stem and valve core will be constrained to simultaneous rotation, which rotation will continue for a quarter of a turn, i. e., until the lug 35 contacts with the stop lug 37, whereupon the valve is fully opened and the component parts thereof again assume the positions shown in Fig. 4.

It will be apparent that during the movement of the valve from its open to its closed position, the ball 38 serves as a means for insuring the simultaneous rotation of the valve stem and valve core during portions of the cycle of rotation of the valve stem, and that when the rotation of the valve core is arrested, the said ball ceases to perform its interlocking function and permits the valve stem to rotate independently of the said valve core. It will be apparent, further, that when the valve stem is rotated independently of the valve core, the trapezoidal or "keystone" shaped cam 28 will rotate with respect to the substantially rectangular recess 33 and that the engagement between the side walls of the recess and the upper corner or lobe of the cam at the widest portion thereof, will effect the tilting movement of the valve core into closed position. Obviously when the valve is moved from its closed to its open position, the ball 38 serves initially to interlock the valve core to the valve body during the time that the cam 28 is tilting the valve core away from the valve seat, and when this tilting has been effected, serves to again interlock the valve stem and valve core for simultaneous rotation.

In Figs. 8 to 12 inclusive of the accompanying drawings, I have illustrated a modified form of my invention which embodies numerous of the features and advantages of the construction shown and described in that form of my invention referred to in the preceding paragraphs. In this embodiment of my invention, the numeral 43 designates broadly a transversely-split valve body comprising sections 44 and 45 having radial flanges 46 and 47 adapted to be secured in tight, abutting relation by means of a series of clamping bolts 48. When clamped together as shown in Fig. 9, these sections 44 and 45 provide a valve chamber 49 having laterally extending passages 50 and 51 for the outflow and inflow, respectively, of the fluid or fluids to be controlled by the valve, these passages 50 and 51 being disposed in axial alinement and being threaded internally to permit the valve to be screwed on to a well casing, pipe, or the like. The outlet passage 50 is preferably provided with a machined valve seat insert 52 positioned at the inner end of said passage. The casing sections 44 and 45 are each provided with a semi-circular recess at the bottom wall of the valve chamber and, when assembled, these cooperating recesses form a centrally-located socket or circular recess 53 at the bottom of the valve chamber, for a purpose to be hereinafter described. The casing sections 44 and 45 are each provided with a semi-circular recess at the top wall of the valve chamber and, when assembled, these cooperating recesses form a centrally-located socket or annular recess 54 at the top of the valve chamber. Immediately above the socket or recess 54 is a third pair of semi-circular recesses which cooperate to form an annular passage 55 of a diameter less than the diameter of the annular recess 54, and immediately above the passage 55 is a fourth pair of semi-circular recesses which cooperate to form a socket or annular recess 56 adapted to receive suitable packing material 57. It will be noted that the recesses 53 and 54, and passage 55, and the recess 56 are all disposed in vertical alinement. Each section 44 and 45 has an upwardly extending portion having notches 58 and 59 adapted to receive the heads of bolts 60 by means of which a "follower" 61 is forced down into the socket or recess 56 to compress the packing 57 contained therein.

The valve stem employed in this modified form of my invention is designated broadly by the reference numeral 62, and includes a non-circular end portion 63 adapted to be engaged by a suitable handle (not shown) by means of which rotation is imparted to the valve stem; a relatively long intermediate portion 64 of circular cross-section and of a diameter corresponding substantially to the diameter of the passage 55; an enlarged portion 65 of circular cross-section and of a diameter corresponding substantially to the diameter of the recess or socket 54; and a lower end portion 66 of substantially "keystone" or substantially trapezoidal shape or configuration, i. e., having two slightly arcuate bases, one of which is longer than the other and which bases are connected by side surfaces which converge from the ends of the longer base to the ends of the shorter base, as is common in all geometrical figures of substantially "keystone" or substantially trapezoidal shape or configuration. This end portion constitutes the cam of a cam-and-socket coupling to be hereinafter described, it being noted that the lower end portion 66 of the stem constitutes a non-circular cam including lobes at least two of which are disposed on opposite sides of the axis of the valve stem.

Adapted for positioning within the valve chamber 49 is a valve core 67 formed with a passage 68 cylindrical throughout its length and of a diameter corresponding substantially to that of the passages 50 and 51 of the valve body. One of the flat, imperforate side portions of the valve core 67 is machined to form a tapered valve face 69, which valve face is of sufficient extent to border the inner margin of the passage 50 and is so machined as to cooperate with the valve seat insert 52 to effect a fluid-tight seal or closure when said face is moved into firm and positive contact with said seat insert. The lower surface of the valve core 67 is provided with a centrally-located trunnion 70, the outer face of which is slightly curved, this trunnion fitting into the recess 53 formed at the bottom wall of the valve chamber 49. The upper surface of the valve core is substantially flat and is provided with a centrally-located, non-circular, trapezoidal or "keystone" shaped recess or socket 71 which constitutes the socket of a cam-and-socket coupling to be hereinafter described, this recess or socket 71 being preferably disposed in axial alinement with the trunnion 70. The valve core 67 is provided with a lug 72 which extends from one side of the core in a direction parallel to the direction of the passage 68 through said core.

Referring now to the manner of assembling the various component parts above described in connection with the modified form of my invention illustrated in Figs. 8 to 12 inclusive, the first step of such assembly consists in inserting the valve core trunnion 70 in one of the lower, semi-circular recesses in one of the sections 44 or 45. The cam 66 of the valve stem 62 is then placed within the socket 71 at the top of the valve core and the enlarged portion 65 of said stem is inserted in one of the semi-circular recesses in the selected section 44 or 45. Assuming that the valve core and valve stem have been assembled in section 44, the section 45 is then placed over the section 44 with the flanges 46 and 47 in abutting relation, and the bolts 48 are inserted and tightened to rigidly secure the two sections of the valve body together. Packing 57 is then placed in the annular recess 56 and the "follower" 61 placed over the valve stem 62 and forced downwardly on said packing by means of the bolts 60, the heads of these bolts having been previously inserted beneath the walls defining the notches 58 and 59.

It is to be particularly noted that the socket 71 in the top of the valve core 67 is of trapezoidal form or configuration, that is, this socket has two straight, parallel walls or bases 73 and 74 of which the wall or base 73 is the longer, these two walls or bases being connected by straight converging walls 75 and 76 of equal length. The walls or bases 73 and 74 are disposed in parallel planes which extend normal to the plane of the valve face 69, and the wall 76 is disposed between the valve face 69 and a plane passing through the axis of the valve stem and parallel to the plane of the valve face 69, while the wall or base 75 is disposed between that side of the valve core opposite the valve face 69 and the said plane passing through the axis of the valve stem and parallel to the plane of the valve face 69. The cam 66 is of substantially trapezoidal form or configuration, having its two opposite, converging sides 77 and 78 of equal length, but differs from a true trapezoid by reason of the fact that its top and bottom sides or bases 79 and 80, respectively, are curved or convexed on arcs struck from the geometrical center of the cam i. e., from the axis of the valve stem, the side or base 79 being of considerably greater length than the side or base 80. The cam 66, when inserted within the socket 71, is disposed with its convexed side or base 79 in sliding contact with the straight wall 73 of the socket 71 and with its convexed side or base 80 in sliding contact with the straight wall 74 of the said socket. The length of the cord of the convex side or base 80 of the cam 66 is considerably less than the length of the wall 74 of the socket and hence the sides 77 and 78 converge at a greater angle than do the walls 75 and 76 of the socket 71. It is to be noted that the length of the cord of the side or base 79 of the cam 66 with respect to the distance between the sides 75 and 76 of the socket 71 is such that the ends of this side or base 79 will at all times engage the opposed walls 75 and 76 of the socket 71. It will thus be apparent that the cam 66 is free to partake of limited rotation within the socket 71 and that the flat side 77 of the cam may be brought into surface contact with the flat wall 75 of the socket or the flat side 78 may be brought into surface contact with the flat wall 76 of said socket. It will also be apparent that as the cam 66 is rotated about its axis the angularity of the sides 77 and 78 with respect to the angularity of the walls 75 and 76, respectively, will enable the said cam to move the member containing the socket 71 to the right or left as viewed in Figs. 11 and 12 of the accompanying drawings, i. e., the upper corners or lobes of the cam 66, as viewed in Figs. 11 and 12, will slide along the adjacent flat side wall 75 or 76, respectively, and as said corners or lobes move in an arc about the axis of the valve stem 62, the tilting of the valve core 67 toward open and closed position will be readily effected by the relative rotation of the cam 66 within the socket 71.

Referring now to the operation of the valve and valve actuating mechanism described above, and assuming that when assembled, the valve is in open position as illustrated in Fig. 10 of the accompanying drawings, rotation of the valve stem 62 in a clockwise direction will cause said valve stem and the valve core 67 to rotate together, due to the flat surface contact between the flat side 78 of the cam 66 and the flat wall 76 of the socket 71. When the valve stem 62 and valve core 67 have been rotated through a quarter of a revolution, the lug 72 strikes the inner surface of the valve chamber, which arrests further rotation of the core, and when this occurs, the valve face 69 is disposed adjacent the valve seat insert 52 with the component parts of the valve and valve actuating mechanisms occupying the positions shown in Fig. 11. Continued rotation of the valve stem in a clockwise direction can no longer effect clockwise rotation of the valve core because of the engagement between the lug 72 and the inner side of the valve chamber, but such further rotation of said stem causes rotation of the cam 66 within the socket 71, which results in the flat side 78 of the cam moving away from the flat wall 76 of the socket, which relative movement causes the upper right hand corner or lobe of the cam 66 as viewed in Figs. 11 and 12, to slide downwardly along the flat side wall 76 of the socket 71 and to force the valve face 69 into contact with the valve seat insert 52, which relative rotation continues until the flat side 77 of the cam is brought into surface contact with the flat wall 75 of the socket. It will be obvious from the preceding explanation of the relative size and shape of the cam 66 and socket 71 that when the cam moves from one position to the other within the socket, the valve core will be tilted about the trunnion 70 and into firm and positive engagement with the valve seat 52, whereupon the valve is fully closed and the component parts thereof assume the positions shown in Fig. 12.

When it is desired to open the valve to permit the flow of fluid therethrough, i. e., when it is desired to move the valve from the closed position shown in Fig. 12 to the open position shown in Fig. 10, a counterclockwise rotation is imparted to the valve stem 62, which rotation causes rotation of the cam 66 with respect to the socket 71, which results in the flat side 77 of the cam moving away from the flat wall 75 of the socket, which relative movement causes the upper left hand corner or lobe of the cam 66, as viewed in Figs. 11 and 12, to slide downwardly along the flat side wall 75 of the socket 71 and to force the valve face 69 out of contact with the valve seat insert 52, which relative rotation continues until the flat side 78 of the cam is brought into surface contact with the flat wall 76 of the socket. It will be obvious from the above explanation that when the cam moves from one position to the other, the valve core will be tilted about its trunnion 70 to thus move the valve face 69 out of contact with the valve seat insert 52. The component parts of the valve now occupy the position shown in Fig. 11 with the flat side 78 of the cam in flat surface contact with the wall 76 of the socket, it being obvious that continued counterclockwise rotation of the valve stem will result in the simultaneous rotation of the valve core until such time as the lug 72 strikes the opposite side of the valve chamber, whereupon the passage 68 will be alined with the inlet and outlet openings 51 and 50, respectively, and the valve will assume the open position as shown in Fig. 10.

It will be noted from the above description of construction and operation that throughout the entire cycle of operation of the valve, the movements of the valve stem and valve core are so timed that they occur at relatively fixed positions. This is an important feature, as it permits the opening and closing movements to be reversed at any stage without interfering with the effective functioning of the several parts. Thus the valve core may be released from sealing or seating contact with the valve seat insert and then, by a reversal of the rotation of the valve wheel or handle, immediately forced again into contact therewith, thereby permitting the "cracking" of the valve to any degree. The valve actuating mechanisms of my present invention are notable for their extreme simplicity of construction and operation, it being noted that there are relatively few moving parts and that such parts are of strong and sturdy construction.

It is to be understood that the forms of my invention shown and described herein are to be taken as preferred embodiments of the same and that various changes may be made in the size, shape and arrangement of parts without departing from the spirit of my invention or the scope of the subjoined claims.

Having thus described my invention, I claim:

1. A valve comprising a valve body having an inlet and an outlet opening and a valve chamber communicating with said opening; a valve seat adjacent one of said openings; a valve core journaled within said chamber and having a valve face thereon; a rotatable valve stem for moving said core to move the valve face thereof into and out of engagement with said valve seat; said valve core including opposed surfaces disposed on opposite sides of the axis of the valve stem and extending transversely to the line of movement of said valve core, and said valve stem having a non-circular cam including lobes which upon rotation of the valve stem engage said surfaces to move the valve core to closed position when the valve stem is rotated in one direction and to move the valve core to open position when the valve stem is rotated in the opposite direction; and means for rotating said valve stem.

2. A valve comprising a valve body having an inlet and an outlet opening and a valve chamber communicating with said openings; a valve seat adjacent one of said openings; a valve core journaled within said chamber and having a valve face thereon; a rotatable valve stem for moving said core to move the valve face thereof into and out of engagement with said valve seat; said valve core including opposed surfaces disposed on opposite sides of the axis of the valve stem and extending transversely to the line of movement of said valve core, and said valve stem having a non-circular cam including lobes disposed on opposite sides of the axis of said valve stem, one of said lobes at all times contacting one of said surfaces to move the valve core to closed position when the valve stem is rotated in one direction, another of said lobes at all times contacting the other of the opposed surfaces to move the valve core to open position when the stem is rotated in the opposite direction; and means for rotating said valve stem.

3. A valve comprising a valve body having an inlet and an outlet opening and a valve chamber communicating with said openings; a valve seat adjacent one of said openings; a valve core journaled within said chamber for sequential and alternate rotative and non-rotative movements therein, said valve core having a passage adapted to be aligned with the inlet and outlet openings when the valve is in open position and a valve face adapted to be moved into and out of engagement with the valve seat; a rotatable valve stem for actuating said valve core in its rotative and non-rotative movements; said valve core including opposed surfaces disposed on opposite sides of the axis of the valve stem and extending transversely to the line of non-rotatable movement of said valve core, and said valve stem having a non-circular cam including lobes at least two of which are disposed on opposite sides of the axis of the valve stem, said lobes engaging said surfaces to rotate the valve core toward closed position and to move the valve face into contact with the valve seat when the valve stem is rotated in one direction, and to move the valve face away from contact with the valve seat and to rotate the valve to open position when the valve stem is rotated in the opposite direction; and means for rotating said valve stem.

4. A valve comprising a valve body having an inlet and an outlet opening and a valve chamber communicating with said openings; a valve seat adjacent one of said openings; a valve core journaled within said chamber for sequential and alternate rotative and non-rotative movements therein, said valve core having a passage adapted to be aligned with the inlet and outlet openings when the valve is in open position and a valve face adapted to be moved into and out of engagement with the valve seat; a rotatable valve stem for actuating said valve core in its rotative and non-rotative movements; said valve core including opposed surfaces disposed on opposite sides of the axis of the valve stem and extending transversely to the line of non-rotative movement of said valve core, and said valve stem having a non-circular cam including lobes two of which are disposed on opposite sides of the axis of said valve stem and are at all times in contact with the opposed surfaces on the valve core and which upon rotation of the valve stem move the valve face into and out of contact with the valve seat when said stem is rotated in opposite directions, and other lobes on said non-circular cam which alternately engage the opposed surfaces on the valve core upon rotation of the valve stem and effect simultaneous rotation of said valve core with said valve stem when said stem is rotated; and means for rotating said valve stem.

5. A valve comprising a valve body having an inlet and an outlet opening and a valve chamber communicating with said openings; a valve seat adjacent one of said openings; a valve core journaled within said chamber and having a valve face thereon; a rotatable valve stem for moving said core to move the valve face thereof into and out of engagement with said valve seat; said valve core having a socket formed therein and including a pair of opposed walls each of which is disposed on opposite sides of the axis of the valve stem and extends transversely to the line of movement of said valve core, and said valve stem having a non-circular cam mounted for limited relative rotation within said socket and including lobes disposed on opposite sides of the axis of said valve stem, one of said lobes at all times contacting one of said walls to move the valve core to closed position when the valve stem is rotated in one direction, another of said lobes at all times contacting the opposed wall of said socket to move the valve core to open position when the valve stem is rotated in the opposite direction; and means for rotating said valve stem.

6. A valve comprising a valve body having an inlet and an outlet opening and a valve chamber communicating with said openings; a valve seat adjacent one of said openings; a valve core journaled within said chamber for sequential and alternate rotative and non-rotative movements therein, said valve core having a passage adapted to be aligned with the inlet and outlet openings when the valve is in open position and a valve face adapted to be moved into and out of engagement with the valve seat; a rotatable valve stem for actuating said valve core in its rotative and non-rotative movements; said valve core having a socket formed therein and including a pair of opposed side walls each disposed on opposite sides of the axis of the valve stem and extending transversely to the line of non-rotative movement of said valve core, and said valve stem having a non-circular cam including lobes at least two of which are disposed on opposite sides of the axis of the valve stem, said lobes engaging the opposed walls of the socket to rotate the valve core toward closed position and to move the valve face into contact with the valve seat when the valve stem is rotated in one direction, and to move the valve face away from contact with the valve seat and to rotate the valve to open position when the valve stem is rotated in the opposite direction; and means for rotating said valve stem.

7. A valve as described in claim 5 wherein the socket in the valve core is substantially rectangular.

8. A valve as described in claim 5 wherein the socket in the valve core is of substantially trapezoidal form with the opposed converging walls of said substantially trapezoidal socket disposed on opposite sides of the axis of the valve stem and transversely to the line of movement of the valve core.

9. A valve as described in claim 5 wherein the non-circular cam is of substantially trapezoidal form with the corners at the ends of the longer base of the substantially trapezoidal cam at all times in contact with the opposed walls of the socket.

10. A valve as described in claim 5 wherein the socket in the valve core is of substantially trapezoidal form with the opposed converging walls of said substantially trapezoidal socket disposed on opposite sides of the axis of the valve stem and transversely to the line of movement of said valve core and wherein the non-circular cam is of substantially trapezoidal form with the corners at the ends of the longer base of the cam at all times in contact with the opposed converging walls of said substantially trapezoidal socket, the angle of the converging walls of the said socket with respect to the longer base thereof being greater than the angle of the converging side surfaces of the cam with respect to its longer base, whereby the cam may partake of limited relative rotation within the socket.

11. A valve comprising a valve body having an inlet and an outlet opening and a valve chamber communicating with said openings; a valve seat adjacent one of said openings; a valve core journaled within said chamber for sequential and alternate rotative and non-rotative movements therein, said valve core having a passage adapted to be aligned with the inlet and outlet openings when the valve is in open position and a valve face adapted to be moved into and out of engagement with the valve seat; a rotatable valve stem for actuating said valve core in its rotative and non-rotative movements; said valve core including opposed surfaces disposed on opposite sides of the axis of the valve stem and extending transversely to the line of non-rotative movement of said valve core, and said valve stem having a non-circular cam including lobes at least two of which are disposed on opposite sides of the axis of the valve stem, said lobes engaging said surfaces to rotate the valve core toward closed position and to move the valve face into contact with the valve seat when the valve stem is rotated in one direction, and to move the valve face away from contact with the valve seat and to rotate the valve to open position when the valve stem is rotated in the opposite direction; means for rotating said valve stem; and locking means actuated by rotation of said valve stem to cause said valve core to rotate with the valve stem during the rotative movements of said valve core within said valve chamber.

12. A valve comprising a valve body having an inlet and an outlet opening and a valve chamber communicating with said openings; a valve seat adjacent one of said openings; a valve core journaled within said chamber for sequential and alternate rotative and non-rotative movements therein, said valve core having a passage adapted to be aligned with the inlet and outlet openings when the valve is in open position and a valve face adapted to be moved into and out of engagement with the valve seat; a rotatable valve stem for actuating said valve core in its rotative and non-rotative movements; said valve core including opposed surfaces disposed on opposite sides of the axis of the valve stem and extending transversely to the line of non-rotative movement of said valve core, and said valve stem having a non-circular cam including lobes at least two of which are disposed on opposite sides of the valve stem, said lobes engaging said surfaces to rotate the valve core toward closed position and to move the valve face into contact with the valve seat when the valve stem is rotated in one direction, and to move the valve face away from contact with the valve seat and to rotate the valve to open position when the valve stem is rotated in the opposite direction; means for rotating said valve stem; and locking means actuated by rotation of the valve stem to permit said valve core to rotate with said valve stem during the rotative movements of the valve core within said valve chamber and to permit relative rotation of said valve stem with respect to the valve core during the non-rotative movements of said valve core to and from the open or closed position of the valve.

13. A valve comprising a valve body having an inlet and an outlet opening and a valve chamber communicating with said openings; a valve core journaled within said chamber for rotative and bodily tilting movements therein for controlling the flow of fluid through said openings; a rotatable valve stem for actuating said valve core; said valve core including a pair of opposed surfaces disposed on opposite sides of the axis of the valve stem and extending transversely to the line of tilting movement of the valve core, and said valve stem having a non-circular cam including lobes at least two of which are disposed on opposite sides of the axis of said valve stem, one of said lobes at all times contacting one of said surfaces to move the valve core to closed position when the valve stem is rotated in one direction, another of said lobes at all times contacting the other of the opposed surfaces to move the valve core to open position when the valve stem is rotated in the opposite direction, and others of said lobes movable into contact with the opposed surfaces whereby rotation of said valve stem causes simultaneous rotation of said valve core in a direction depending upon the direction of rotation of the valve stem; means for rotating said valve stem; and means for arresting the simultaneous rotation of said valve core by said valve stem and permitting the valve stem to rotate independently of said valve core.

14. A valve comprising a valve body having an inlet and an outlet opening and a valve chamber communicating with said openings; a valve core journaled within said chamber for rotative and bodily tilting movements therein for controlling the flow of fluid through said openings; a rotatable valve stem for actuating said valve core; said valve core including a pair of opposed surfaces disposed on opposite sides of the axis of the valve stem and extending transversely to the line of tilting movement of the valve core, and said valve stem having a non-circular cam including lobes at least two of which are disposed on opposite sides of the axis of said valve stem, one of said lobes at all times, contacting one of said surfaces to move the valve core to closed position when the valve stem is rotated in one direction, another of said lobes at all times contacting the other of the opposed surfaces to move the valve core to open position when the valve stem is rotated in the opposite direction, and others of said lobes movable into contact with the opposed surfaces whereby rotation of said valve stem causes simultaneous rotation of said valve core in a direction depending upon the direction of rotation of said valve stem; means for rotating said valve stem; means for arresting the simultaneous rotation of said valve core by said valve stem and permitting the valve stem to rotate independently of said valve core; and locking means actuated by rotation of the valve stem during a portion of the cycle of rotation of the valve stem, which locking means is rendered ineffective when the arresting means becomes effective, to permit relative rotation of said valve stem with respect to said valve core during other portions of the cycle of rotation of said valve stem.

ALFRED G. HEGGEM.